Aug. 26, 1924.  
C. G. PULLIN  
1,506,270  
MEANS FOR SUPPORTING THE REAR ROAD WHEEL OF A VELOCIPEDE  
Filed July 20, 1920     3 Sheets-Sheet 3
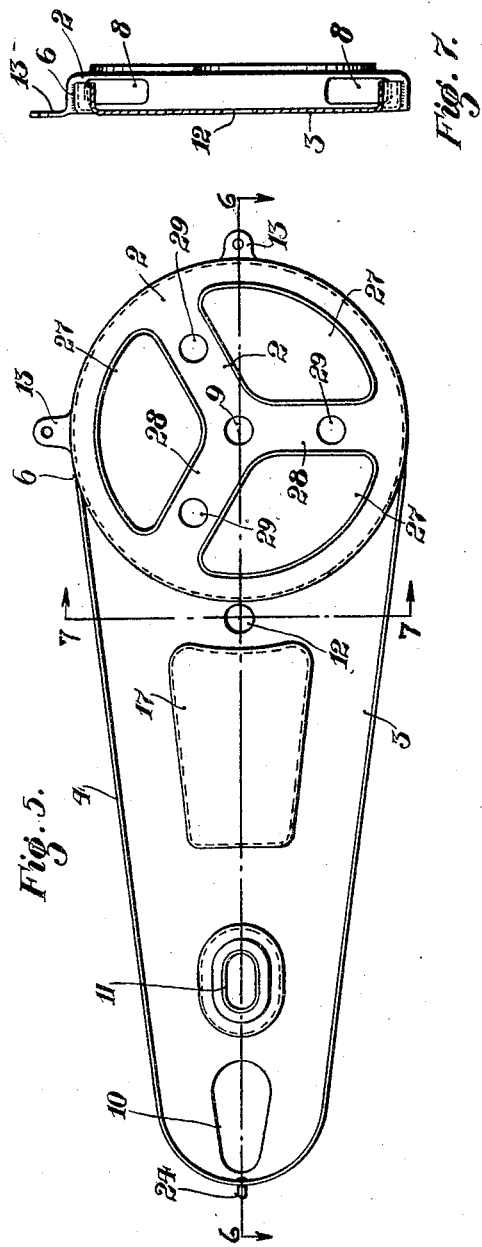
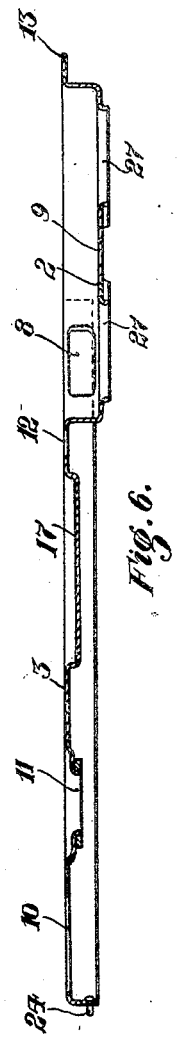
C. G. PULLIN.  
*Inventor.*  
per:- Eugene C. Brown  
*Attorney.*

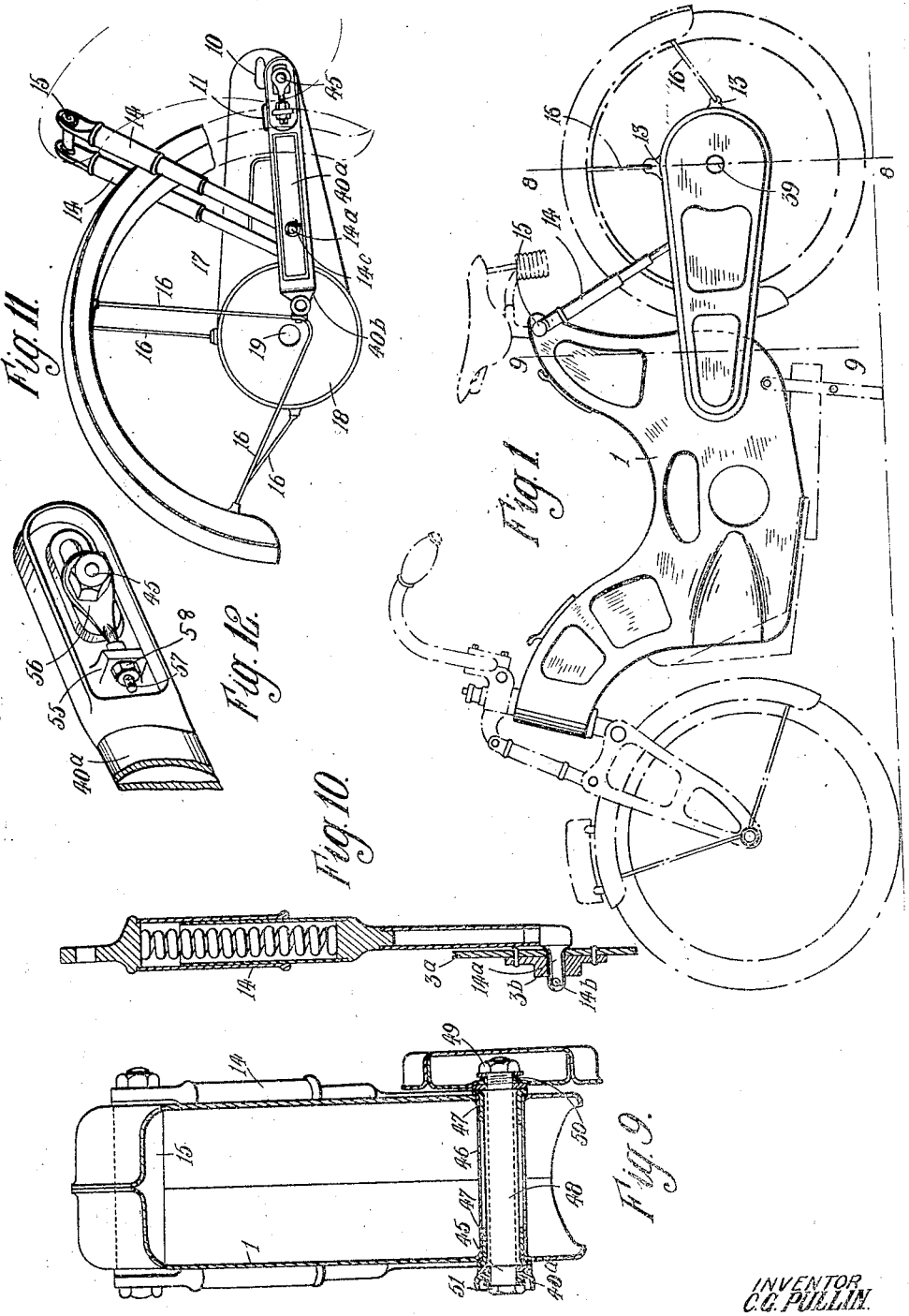

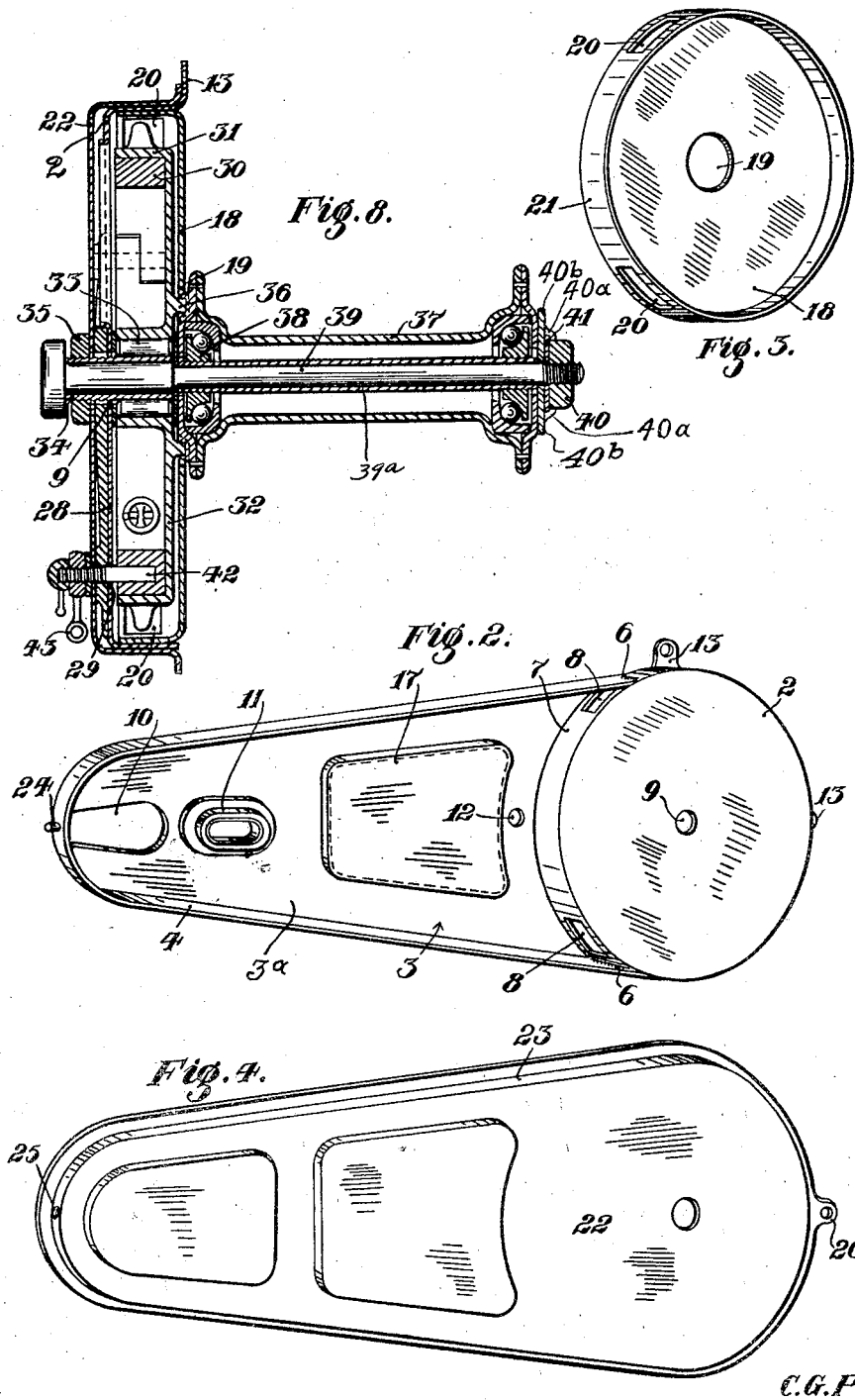

Patented Aug. 26, 1924.

1,506,270

UNITED STATES PATENT OFFICE.

CYRIL GEORGE PULLIN, OF ISLEWORTH, ENGLAND.

MEANS FOR SUPPORTING THE REAR ROAD WHEEL OF A VELOCIPEDE.

Application filed July 20, 1920. Serial No. 397,570.

*To all whom it may concern:*

Be it known that I, CYRIL GEORGE PULLIN, a subject of the King of Great Britain, residing at Isleworth, Middlesex, England, have invented certain new and useful Improvements in Means for Supporting the Rear Road Wheel of a Velocipede, of which the following is a specification.

This invention relates to means for supporting the rear wheel of a velocipede, and has for its object to provide an improved construction to enable the rear road wheel to be withdrawn from the bottom fork without upsetting the operative relation of the chain and the wheels.

In ordinary pedal driven velocipedes, the bottom fork is connected to the centre frame by rigidly connecting the forward end of the fork to the crank hanger of the frame. It has been proposed, however, to construct one arm of the bottom fork as a gear case to enclose the driver and driven sprockets and the chain.

According to the present invention the arms of the bottom fork are pivotally connected to the centre frame, and the arm formed as a gear casing carries a rigidly connected bearing for the sprocket of the road wheel, this bearing being separate from the bearing of the road wheel, and the sprocket being provided with means for driving the road wheel while the spindle of the road wheel passes through the sprocket bearing in order to retain the road wheel in operative relation with the arms of the fork, the arrangement being such that on the removal of the road wheel spindle the wheel is free to be displaced from the bottom fork.

Preferably, the arm of the bottom fork which is constituted as a gear case member is detachably connected to the pivot pin of the bottom fork.

It should be here clearly understood that I am not making a claim to the novelty per se of a rear road wheel sprocket mounted on bearings separate from the road wheel and provided with driving dogs, which is common practice in motor driven velocipedes, of which the bottom fork is constituted by two connected tubular arms, rigidly fixed to the frame, or to the novelty of a gear case member pivotally mounted on the frame of the machine, except insofar as pointed out in the appended claims.

In this specification and the following claims I mean to include in the term "gear case" either a construction in which the drive is a chain drive, or that type of friction drive which is obtained by the use of a belt with pulley wheels as is often used on motor driven velocipedes. In order to clearly explain my invention, I am referring, as an example, to its application to a motor driven bicycle of the type comprising a box-like structure as the frame, and as described in my co-pending application No. 397,567, dated 20th July, 1920, which has resulted in Patent No. 1,479,738.

In order that my invention may be more clearly understood, I will now describe the same with reference to the accompanying drawings, in which Fig. 1 is a general elevation of motor cycle having a box-like centre frame, and provided with a gear case constructed according to the invention; Fig. 2 is a front view of a simple form of the chain case; Fig. 3 is a closure member which will be inserted at the back of Fig. 2 to complete the housing for the sprocket driving member of the rear road wheel. Fig. 4 shows a front view of a cover member which I prefer to use with a gear case as shown in Fig. 2, in order to completely enclose the chain race, the cover member extending over the whole of the gear case; Fig. 5 shows a form of the gear case when it is pressed out from sheet metal and further provided with perforations for the reception of pivot axes of a brake member for the driving sprocket; Fig. 6 being a section on the line 6—6 of Fig. 5 and Fig. 7 being a section in the line 7—7 of Fig. 5; Fig. 8 is a vertical section taken through the gear case and spindle of the rear road wheel on the line 8—8 in Fig. 1; Fig. 9 is a vertical section on the line 9—9 of Fig. 1; Fig. 10 shows in detail to an enlarged scale one of the telescopic members; Fig. 11 is a pictorial view showing the rear road wheel supports assembled according to this invention; and Fig. 12 illustrates chain adjusting gear.

Referring to the drawings:—a gear case is shown in Figs. 2, 3 and 4, adapted for use for a motor cycle having a box-like centre frame, as indicated at 1 in Fig. 1 and constructed as described in my co-pending application No. 397567, which has resulted in Patent No. 1,479,738. The gear case itself is so formed as to provide a housing 2 for the driving sprocket of the road wheel and a race 3 for the chain drive. The race is formed by the provision of a flange 4 on the wall 3ᵃ of the gear case and which adjoins as at 6, the outer wall 7 of the aforesaid sprocket housing. It will be noticed that the wall 7 of the housing separates the housing from the race and this wall is provided with slots 8 to permit the passage of the chain connected to the driving sprocket. Centrally of the housing is provided a bearing aperture 9 for the projection therethrough of the spindle 39 of the rear road wheel and bearing of the driving member.

At the forward end of the gear case is provided an opening 10 for the reception of the driver sprocket carried in bearings on the frame 1 and geared to the engine of the velocipede through any suitable change speed arrangement. Adjacent the aperture 10, and just behind the same is provided a flanged opening 11 for the reception of a supporting axis pin 45 carried by the frame of the velocipede.

To this end the frame 1 is perforated at each side near the rear thereof, and a tube 46 welded in (see Fig. 9). In each end of the tube is disposed a short distance sleeve 47, which sleeve carries a second tube 48, which latter then provides in known manner an extended bearing for the axis pin 45.

The pin extends beyond each side of the frame 1 to form pivots for the two arms of the bottom fork, that is, the arm comprising a gear case as just described and the other of ordinary form, indicated by the reference 40ᵃ, and is screw threaded at each end of the frame, and on one side of the frame the pin end passes through the opening 11 in the wall 3ᵃ of the gear case and forms a pivot therefor, the latter being secured thereon by a nut and washer indicated at 49, in a manner permitting oscillations of the gear case about the pin; a seating for the washer being provided by disposing a packing ring 50 about the flanged opening 11. The other end of the pin carries an arm 40ᵃ, which is pivotally retained thereon by a nut and washer indicated at 51.

In such a construction the bottom fork of the bicycle comprises two arms pivoted on the frame, one arm being the gear case and the other the arm 40ᵃ, which is of known construction, being tubular, and flattened out at the rear end, as indicated at 40ᵇ (Figs. 8 and 11), such end being perforated to take the spindle 39 of the rear road wheel, as hereafter explained with reference to Fig. 8, the other end of the arm 40ᵃ being preferably formed as shown in Figs. 11 and 12 for the purpose of housing a chain adjuster, as hereafter described.

The support for the rear road wheel comprises, in addition to the pivotally mounted bottom fork referred to above, telescopic stay members 14 of usual form, but illustrated in Fig. 10, which are pivotally connected to the frame of the velocipede at 15 (see Figs. 1, 9 and 11) and to the gear case and arm 40ᵃ by pivotal means now to be referred to.

Referring to Fig. 10 it will be noticed that the lower member of the telescopic stay 14 includes a pin 14ᵃ. The pins 14ᵃ form a pivoted connection between the telescopic stay members and the gear case member and the other arm (40ᵃ) of the bottom bracket. The pin 14ᵃ of the near side member 14 passes through the opening 12 of the gear case, and is secured by a cotter pin 14ᵇ; the opening 12 may be extended by a bearing 3ᵇ riveted to the wall 3ᵃ of the gear case, as indicated in Fig. 10. The bottom bracket arm 40ᵃ may be secured on the pin 14ᵃ of the off-side member 14 by a washer and cotter pin as indicated at 14ᶜ in Fig. 11.

It will be noticed that both the apertures 10 and 11 are elongated, that is to allow movement of the gear case about its supporting pivot at 11 and the necessary clearance for the displacement of the axis, relatively to the gear case of the driver sprocket disposed within the aperture 10. Suitable lugs, as shown at 13, are also provided for the attachment thereto of mud guard stay members 16 as clearly shown in Fig. 1.

The gear case may be strengthened by forming panels, such as 17, so disposed, as not to interfere with the passage of the chain connected to the driving sprocket of the rear road wheel. It is generally desired that the driving mechanism of the rear road wheel shall be maintained as far as possible free from dust, grit, or other fouling matter. To this end, I provide a closure member 18, as shown in Fig. 3, which fits into the housing 2 and is placed therein from the back. The closure 18 has a central aperture 19 for the required clearance of the rear road wheel spindle bearings and is also provided with slots 20 on this peripheral wall 21 disposed so that they register with the slots 8 when the closure is disposed within the housing. By this means, the driving mechanism and all the working parts disposed on the one side of the gear case are totally enclosed, but on the other side, the chain race, the supporting bearings at 11 and the driver sprocket at 10 are all exposed, and to totally enclose the chain race, a cover member 22 which is shown in Fig. 4 is designed to entirely cover the gear case, and has a peripheral flange 23 which fits over the peripheral flange 4 of the gear case, and is maintained in register therewith by means of a lug 24 on the outer face of the flange 4 of the gear case at the forward end, and a perforation 25 disposed to register with the lug 24 in the flange 23 of the race cover 22, while at the rear of the cover, a lug 26 is provided so that the fixing means used for connecting the mud guard stay 16 to the lug 13 as shown in Fig. 1, may be also utilized for detachably clamping the rear end of the cover 22 to the gear case.

In the modified arrangement shown in Figs. 5, 6 and 7, the sprocket housing 2 is provided with apertures 27 which are so arranged as to leave three arm members 28 connecting the centre of the housing to the circumference. Each of these arm members is provided with a perforation 29 for the projection therethrough of an axis pin for the segmental members 30 of an expanding brake member adapted to contact with an inner face formed on the rim 31 of the driver sprocket as shown in Fig. 8.

The construction shown in Figs. 5, 6 and 7 is formed by pressing from sheet metal; the sprocket housing for the integral arms being formed by the operation of pressing from one side of the sheet, while the chain race with its flanged periphery 4 is formed by the pressing operation from the other side of the sheet, and where the peripheral flange 4 of the chain race meets the wall 7, (at 6) of the sprocket housing 2, it may be rendered integral therewith by suitable means, such as spot welding.

Referring now to Fig. 8, the driving sprocket of the rear road wheel is indicated by a central sectional elevation identified by the numeral 32 and is shown disposed within the housing 2 of the gear case, the housing being completed by the closure member 18 disposed within it. It will be noticed that the driving sprocket is supported on roller bearings 33, retained in position by a fixed sleeve member 34 having a threaded extremity projected through the aperture 9 in the gear case and the registering, central, aperture of the cover 22, and this sleeve may be clamped in position within the sprocket casing and cover by any suitable means, such as a nut 35, the sprocket web is further provided with driving dogs as shown at 36 for engagement with the hub 37 of the rear road wheel, which hub is provided in the usual way with ball races 38.

In assembling these parts together, the wheel is introduced between the arms of the rear fork, and a knock-out spindle 39 is projected through the sprocket wheel and hub of the rear road wheel, the hub comprising a pair of ball races and cones connected and retained in position by an axial sleeve member 39ª in the usual way, which abuts against the flattened end 40ᵇ of the tubular arm 40ª of the bottom fork, said sleeve acting as the bearing surface for the spindle 39 of the rear road wheel, the said spindle being maintained in position within the hub by a nut 40 and washer 41 engaging over the end of the spindle against the outer face of the flattened end 40ᵇ of the tubular arm 40ª of the bottom fork, the arm being therefore pressed against the adjacent extremity of the axial sleeve so that the sleeve and spindle are held stationary. As shown in the lower part of Fig. 8, the axis pins 42 for the segmental members of the expanding braking device are projected through the apertures 29 of the housing and thereby retain the segmental members in position for engagement with the inner face of the overhung rim 31 of the sprocket wheel by operation of a suitable lever 43. The exact construction of this method of braking the sprocket wheel 32 is duly set out in my copending U. S. application No. 397569, dated 20th July, 1920 for "Improvements in or relating to braking systems", which has resulted in Patent No. 1,446,395.

By forming rear fork structures according to this invention, I provide means whereby the rear road wheel can be easily and quickly removed from the velocipede frame by merely removing the knock-out spindle 39, as the driving sprocket, and its bearings are independently supported in the housing of the gear case and frame in proper operative position, when the rear road wheel is removed. It will be remembered that the other member of the fork is formed in the usual way.

The pivot pin 45 may be associated with chain adjusters of ordinary form at each end. Fig. 12 clearly shows the arrangement on the arm 40ª of the bottom bracket which comprises an abutment 55 on a plate 56 perforated to engage over the respective end of the pin 45. The plate 56 has a threaded shank 57 which engages in a tapped hole in the abutment, a nut 58 screwed on to the shank 57 working against the abutment causing a relative displacement of the arm 40ª as will be well understood. The outside of the gear case arm may be similarly provided with an abutment and co-operating plate, but this is not illustrated, it being easily understood.

I claim:

1. Means for supporting the rear road wheel of a motor driven velocipede comprising, in combination with the centre frame of the velocipede, a bottom fork member pivotally secured to the centre frame member, one arm of the fork member being of tubular formation and the other arm formed as a gear case to enclose the driving gear of the rear road wheel, a rigidly connected bearing in said gear case, a sprocket wheel mounted on said bearing, means permitting driving relation between said sprocket wheel and said road wheel, a spindle for said road wheel, carried by both of said arms and projected through said bearing, and telescopic stay members pivotally connected to the rear ends of the bottom fork arms and to the top of said centre frame.

2. Means for supporting the rear road wheel of a motor driven velocipede comprising, in combination, a centre frame, an axis pin carried at the bottom of said frame, a tubular arm pivotally mounted on said axis pin on one side of the frame, a sheet metal arm carried on said axis pin on the other side of said frame, and formed so as to comprise a housing for a rear road sprocket wheel on one side, and a separate integral housing for a drive for a sprocket wheel on the other side, a bearing rigidly connected to said gear case, a sprocket wheel mounted on said bearing, means permitting driving relation between said sprocket wheel and road wheel, a spindle for the road wheel carried by both of said arms and projected through said bearing, and telescopic stay members pivotally connected to the rear ends of the bottom fork arms and to the top of said centre frame.

3. A bottom fork member for the rear road wheel of a motor driven velocipede comprising, in combination, a tubular arm, a sheet metal arm, an axis pin connecting said arms, said sheet metal arm comprising an integral housing on each side, separated by an integral slotted wall, one of said housings being of circular configuration, a closure fitting in said housing of circular configuration, and a cover extending over the whole of the sheet metal arm and on the other side of said arm to said closure.

4. A bottom fork member comprising, in combination, a tubular arm and an arm formed from sheet metal comprising on one side a chain race and on the other side a housing for a sprocket wheel, an axis pin connecting said arms, a closure for said housing, and a cover for said sheet metal arm, all as set forth.

5. The combination on a motor driven velocipede of a centre frame of box-like construction, an axis pin carried at the bottom of said frame, a tubular arm connected to said axis pin on one side of said frame, a sheet metal arm as set forth mounted on said axis pin on the other side of said frame, a sprocket mounted on bearings rigidly connected to said sheet metal arm, a rear road wheel, means for associating said road wheel and said sprocket wheel in driving relation, a knock-out spindle for said road wheel, carried by said arm and projected through said bearing, and telescopic stay members pivotally connected to the rear ends of the bottom fork arms and to the top of said centre frame.

In testimony whereof I affix my signature.

CYRIL GEORGE PULLIN.